United States Patent [19]

Caputo

[11] Patent Number: 4,576,669
[45] Date of Patent: Mar. 18, 1986

[54] "ON DEMAND" APPARATUS AND METHOD FOR PRODUCING AIR-CUSHIONING PRODUCT

[76] Inventor: Garry L. Caputo, 464 Riverside Ave., Rutherford, N.J. 07070

[21] Appl. No.: 669,684

[22] Filed: Nov. 9, 1984

[51] Int. Cl.$^4$ .............................................. B32B 31/12
[52] U.S. Cl. .................................... 156/145; 156/209; 156/289; 156/292; 156/308.4; 156/309.9; 156/471; 156/499; 425/388; 428/166; 428/172; 428/178
[58] Field of Search ................. 156/145, 209, 210, 77, 156/285, 292, 308.4, 443, 470, 471, 553, 289, 499, 309.9, 322; 219/469; 425/388; 428/166, 172, 178

[56] References Cited

U.S. PATENT DOCUMENTS

| | | | |
|---|---|---|---|
| 3,401,439 | 9/1968 | Staats et al. | 219/469 X |
| 3,471,683 | 10/1969 | Bogue | 219/469 |
| 4,314,865 | 2/1982 | Ottaviano | 156/145 |

Primary Examiner—Robert A. Dawson
Attorney, Agent, or Firm—Ralph R. Roberts

[57] ABSTRACT

There is depicted and claimed "on demand" apparatus and method for producing air-cushioning material for end-user manufacture. There are two arrangements and both provide economy of apparatus, space, labor and materials. Two thermoplastic film strips are carried from roll storage means to this air-cushioning forming means whereat the webs of film are locally heat-sealed together. A first film is fed to a heated roll whereat this film is heated sufficiently to be thermoformed on a cooled roll with cavities formed therein. These cavities are manifold-connected to a source of vacuum which draws the heated film into the formed cavities. The second strip of film is fed to another heated roll having a resilient covering material with thermoconductive metal powder as a substantial component, thus providing sufficient thermoconductivity and resilience to heat-seal or weld this second film to those areas around the cavities formed in the first film. This resilient surface or cover surface on the heated roll is sufficient to accommodate imperfections on interstice portions of the forming roll to effect full welding of those portions of film between formed cells. A cooled roll is provided to set the seal and/or welds of the strip of air-cushioning product. The product may then be stored in roll form or cut to short lengths for immediate use.

18 Claims, 4 Drawing Figures

"ON DEMAND" APPARATUS AND METHOD FOR PRODUCING AIR-CUSHIONING PRODUCT

Description of the Prior Art

Air-cushioning material is well known as packing dunnage both for its low cost and light weight and also for its convenience and strength. This dunnage product utilizes flexible plastic sheet material and in the present invention is directed to and toward thermoplastic films in strip or roll form. The storage of the material in roll form is economical of space and cost and the present invention contemplates an "on demand" capability leading to an almost immediate supply of cushioning material. The method and apparatus for producing such product includes a heat-sealable plastic sheet which is heated to bring a surface to a temperature in the proximity of fusion, welding or melting. This sheet is shaped by a cavitied provided in an embossing drum or plate. Vacuum is used to form this sheet. Another sheet or strip of film is heated to a fusion or welding temperature and then laminated to the thermoformed sheet of film. The welding or laminating step anticipates that both films have their facing surfaces sufficiently heated to weld and pressure applied to form this weld, thus adhering the two films together. At least the temperatures of the film surfaces at the weld are sufficient for the weld to be achieved, and are of course equalized when fusion or welding is achieved.

There are many patents in the air cell cushioning dunnage field, such as, for instance, Australian Pat. No. 160,551, published Oct. 29, 1953, and U.S. Pat. Nos. 3,018,015; 3,142,599; 3,231,454; 3,285,793; 3,349,990; 3,577,305; 3,389,534; 3,523,055; 3,575,781; 3,616,155; 3,785,899; 3,817,803; 3,837,990; 3,837,991; 3,868,056; 4,076,872; and 4,096,306. In addition, U.S. Pat. Nos. 3,416,984 and 3,392,081 show basic construction methods, and U.S. Pat. Nos. 4,415,398 and 4,427,474 show plural sheets and/or drum apparatus. In general, the prior art apparatus contemplated is for high production and the resulting product is sold as big rolls or packages. Applicant's apparatus is for use by a manufacturer at and in his packing room. This apparatus is small and more or less self-contained. The simplicity of apparatus enables interruption of production and, when required, easy repair of the apparatus.

SUMMARY OF THE INVENTION

The invention of Applicant to be described and illustrated hereinafter provides apparatus and a method for the production of air-cushioning dunnage with flexible sheeting material supplied in roll form. The films are of high strength and high resistance to loss from the produced cells. The apparatus of this invention is small in size and can be interrupted conveniently in operation without destroying the desired product and its intended end use. If desired, the dunnage product can and may be stored in a small roll form.

This invention may be summarized, at least in part, with reference to its objects. It is an object of this invention to provide, and it does provide, a novel apparatus and method for the production of air-cushioning dunnage in strip form with and of a flexible thermoplastic film requiring a minimum of apparatus.

It is a further object of this invention to provide, and it does provide, apparatus which is quite compact and utilizing a resilient covering having thermoconductivity, with said covering on a heated roll so that the strips of film may be welded one to another at localized and on irregular areas and surfaces to insure fusion of and at the desired contact areas.

It is a further object of this invention to provide, and it does provide, apparatus and method wherein the compact apparatus produces air-cushioning dunnage which can be interrupted in its production cycle and the cycle resumed without harm to the product or the apparatus and with minimum attention by an operator.

In brief, this apparatus employs very little room as it is designed for use in the packing or shipping room. Attendant time or skill is minimal for the operation of this apparatus in which supply is from two storage rolls of thermoplastic film. One or both films may be laminated films structured to inhibit air escape. The surfaces of the film are adapted to be softened so as to weld to another film with sufficient heat and pressure. A forming roll has cavities of a desired configuration and depth. Each cavity communicates to a manifold connected to a source of vacuum. One of the strips which is structured for thermoforming into pockets is fed to a heated roll whereat and whereon the advancing film is heated to a forming temperature. The film passes from this heated roll to a forming roll having the cavity formations. The vacuum draws the softened and heated film strip into the formed cavities, and as this roll is water-cooled the pockets are shaped and set. While still on this roll, another film which is heated by a roll having an elastomeric metal mixture coating is brought to the formed film strip and by and with the roll with the elastomeric covering the two heated films are pressed together at those areas around the cavities to form seals or welds at the interstices between pockets. After welding the product is fed to a chill roll which sets the welded plies of film, after which the air-cushioning dunnage is cut to length for packing use or wound on an accumulating roll for storage for subsequent use.

There are shown two arrangements for novel apparatus for producing encapsulated air-cushioning materials at low cost with minimum moving parts at speeds substantially higher than for present apparatus for continuous motion thermoform and seal machine. This apparatus is unique as far as its ability to form and seal a variety of thermoplastic materials. These materials include unsupported polyethylene, polypropylene, PVC, acrylic, polyacrylonitrile, polyester, nylon, EVA, EMA, etc. It is also versatile in running structured materials as well, as for example PET/polyethylene homo-polymer or co-polymer and EMA, etc. The simplicity of this apparatus allows usage at the end user's level to produce an even lower cost air-cushioning product.

In addition to the above summary, the following disclosure is detailed to insure adequacy and aid in understanding of the invention. This disclosure, however, is not intended to cover each new inventive concept no matter how it may be disguised later by variations in form or additions of further improvements. For this reason, there has been chosen a specific embodiment of the apparatus for producing air-cushioning dunnage for "on demand" use in a shipping and/or storeroom as adopted for use for short-run operation and minimum operator attention and showing a preferred means for construction of the apparatus.

This specific embodiment has been chosen for the purposes of illustration and description as shown in the accompanying drawings wherein;

BRIEF DESCRIPTION OF THE DRAWINGS

In the following description and in the claims, various details are identified by specific names for convenience. These names are intended to be generic in their application. Corresponding reference characters refer to like members throughout the several figures of the drawings.

The drawings accompanying, and forming part of, this specification disclose details of construction for the purpose of explanation, but structural details may be modified without departure from the concept and principles of the invention and the invention may be incorporated in other structural forms than shown.

EMBODIMENT OF FIGS. 1 AND 2

Figure 1:
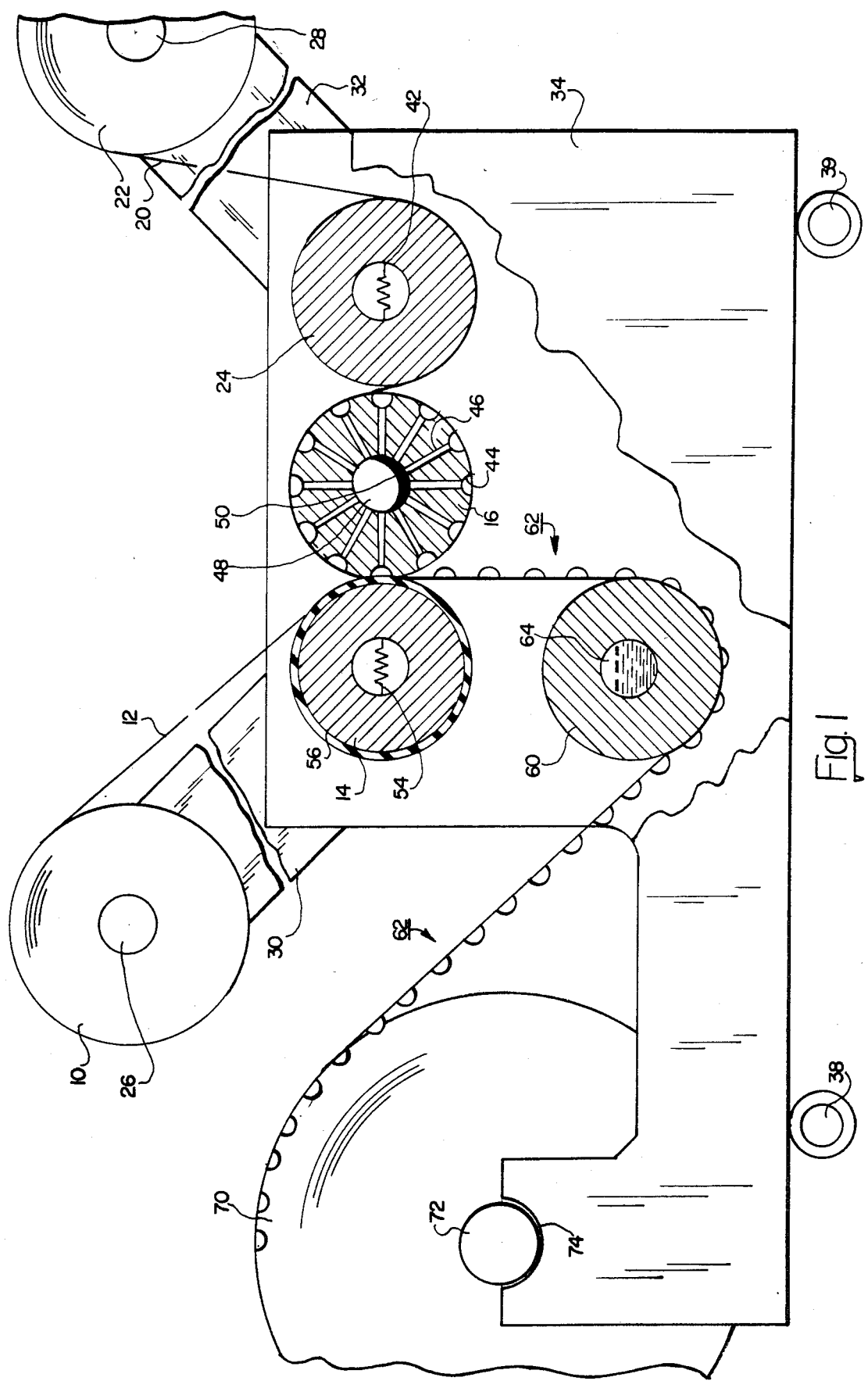
FIG. 1 represents a side view partly in section and very diagrammatic and showing the "on demand" apparatus for producing air-cushioning material.

Referring next to the drawings and the apparatus depicted therein, the general arrangement is shown to illustrate the economy of components and of operation steps required for "on demand" apparatus for forming the air-cushioning material. From a supply roll 10, a web of film 12 is fed to and between a heated roll 14 and a forming roll 16. Another strip of thermoplastic film 20 is carried by and on a supply roll 22 and is fed to a heated roll 24. Both rolls 10 and 22 are rotatable on shaft means and for the purposes of identification are numbered 26 and 28, and are shown as carried on and by arms 30 and 32 having their lower ends secured to frame portions 34 and 36. In FIG. 1 there are depicted wheels 38 and 39 which indicate support of the frame portions. Any roller or wheels may be employed and no patentable distinction is ascribed thereto.

In FIG. 1 the film 20 carried in roll form is fed to metallic roll 24, which is depicted as heated by electrical energy from a source 42. Thermostatic control of the temperature to establish the surface temperature and maintain this temperature throughout the cycle of operation is contemplated. Electrical energy is depicted, but other means may be provided and no patentable distinction is ascribed thereto. Journal and shaft means for roll 24 are conventional and are not shown to reduce the descriptive explanation.

Roll 16 as diagrammatically shown in FIG. 1 is with film 20 thereover with exposed cavities 44 formed therein and thereon. Each cavity is connected by a small passageway 46 to a source of vacuum 48. So that vacuum is applied only to heat-softened film 20, shut-off device or guard 50 is provided to insure that those cavities 44 not having thermoplastic film in way thereof are not connected to this source of vacuum, thereby destroying the level of vacuum and causing the vacuum pump to work overtime.

The shape of the cavity 44 is merely a matter of preference, but usually the height of the cell is from one-quarter to one-half inch and the diameter is about three-eighths to one and three-eighths inches. The size and shape of the air cell is easily changed by substituting roll 16 for another like roll. The small passageway for each cavity 46 is usually a drilled hole as the less expensive procedure. Usually the roll 16 is of cast metal such as aluminum, but may be of any conductive material. Cooling means is provided so that the roll 16 does not become overheated. This cooling may be by. water flow, not shown, but conventional in thermoforming with or by roller means.

Film 12 is carried in roll form 10 on shaft or support 26 and is thermoplastic. This strip film is heated by roll 14 which is heated by electrical energy indicated as 54. This roll is unique in that there is provided an elastomeric metal mixture as a coating or covering. This outer-diameter covering is not only resilient, but is also conductive as to heat. Essentially this covering provides means for insuring that the heated film strips are welded together at the interstices around the formed cavities. This mixture of rubber or rubber-like material and metal powder provides sufficient conductivity for carrying heat from the center of the roll to the cover 56. This cover is sufficiently resilient to accommodate small irregularities in diameters of rolls 14 and 16.

The film 12 fed from roll 10 is heated by the conductive heated surface 56 of roll 14. This roll moves in a timed relationship to the cavity roller 16 so that pressing action is with direct rolling contact. It is to be noted that the welding or heat-sealing of film 12 to formed film 20 is at a line through the axis of each roll. Roll 14 is carried by a shaft supported by the frame members 34 and 35, and adjustment of the two axes toward or away from each other is dependent on the thicknesses of the films and the needed pressure for effecting the weld. As seen in FIG. 1, after the product (identified as 62) as been welded, it proceeds to a cooling roll 60.

Roll 60 is disposed to contact the same surface and side of film 12 as roll 14. This roll is indicated as water-cooled by a symbolic showing to and at shaft 64. This is commonly designated as a "chill" roll which is used to set (cool) the seals or welds of the two films brought to and between rolls 14 and 16. The air cushioning or bubble is exterior of the roll 60 periphery so as not to distort the shape of the bubble until the product is used for packing or storage.

From roll 60 the product 62 moves to an accumulating roll 70 which is depicted as carried in open cup-bearing portions 72 provided in the side frame members 34 and 35. A shaft 76 is turned with a proper accommodations for diameter or with a slip clutch, both of whch are well known in the handling of films. Rather than a roll 70, the product may be fed to a bench or table, not shown, whereat an attendant cuts the product 62 to the shape and length desired.

Figure 2:
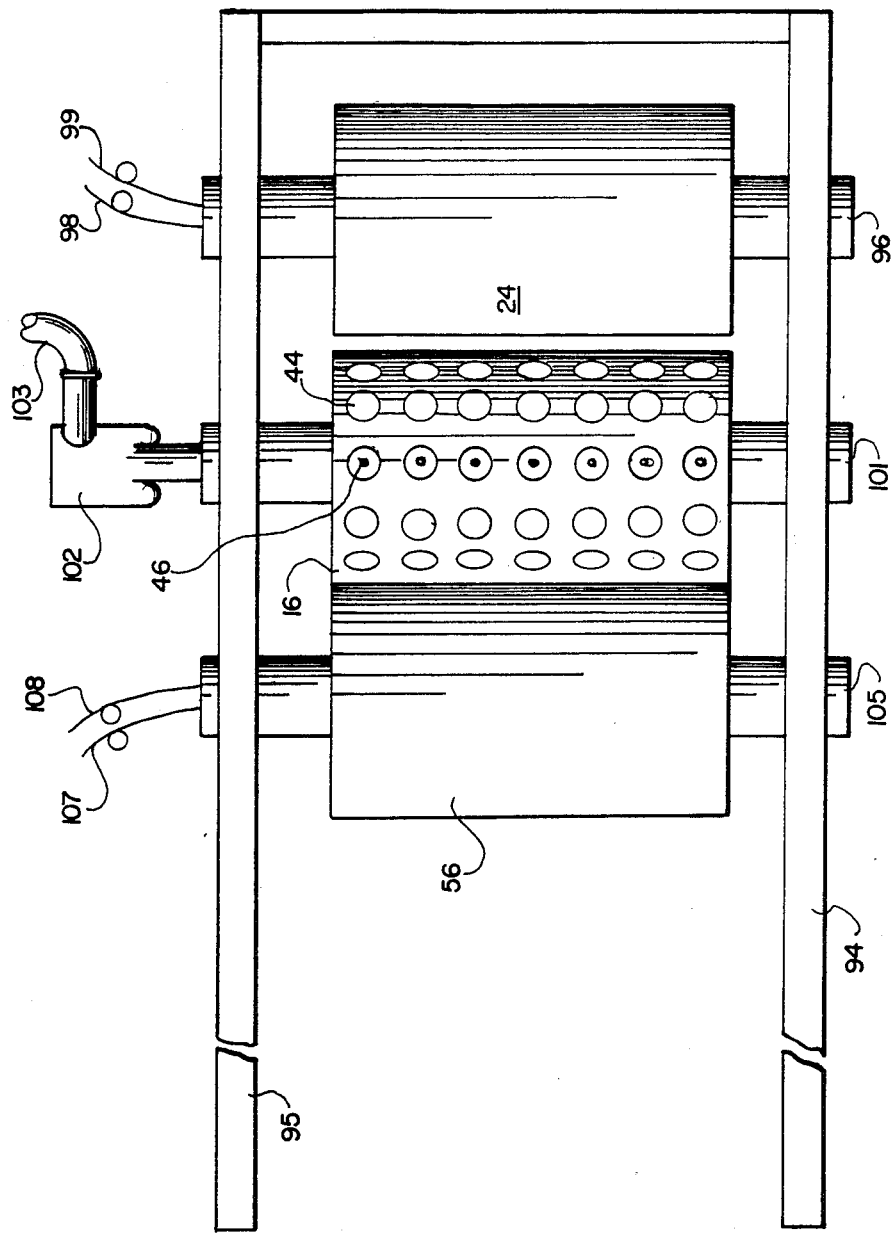
FIG. 2 represents a plan view of the apparatus of FIG. 1, also very diagrammatic and showing the relative arrangement of the rolls both for carrying and accumulating the plastic film and the arrangement of processing rolls.

The apparatus depicted in FIGS. 1 and 2, and described above, provides for the production of air-cushioning material with a minimum of rollers and controls. It is to be noted that from roll 22 the film 20 is fed to heated roll 24 and the space between rolls 24 and 16 is minimal and as shown with the axes of these rolls much in line. This alignment is not critical, but as arranged the wrap contact of film 20 with heated roll 24 is about one hundred seventy to one hundred seventy-five degrees. The wrap contact of the now-heated film 20 to the periphery of the forming roll 16 is about one hundred eighty degrees. The anticipated use of this cooled forming roll 16 is an arc of about twenty degrees with an arc of about one hundred sixty degrees employed for cooling and sealing or welding of the two films together.

The resilient cover material 56 on roll 14 presses the two films together to effect the weld or seal. The film 20 that is drawn into the cavity is not in contact with film 12 so air cells are sealed with the lidding film 12, insuring that cells are filled with air. The film used with both the forming film strip 20 and the lidding film strip 12 is made of a material to inhibit air escape. Polyethylene is a plastic having a low melting point and is easily sealed to another like plastic so that the films 20 and 12 have the contacting surface portions made of such film. Polyethylene as a film material does not have the desired air passage-inhibiting properties. This film is readily combined with nylon and Mylar (TM DuPont) which are films with properties that inhibit passing of air. Coating and coextrusion production means is conventional and well known. The apparatus described above is designed to accept any films, including combinations to be developed.

The lidding film 12 carried n roll 10 is delivered to the roll 14 and the resilient heated cover material 56 at a predetermined angle, which is shown as about forty-five degrees. Arm 30 provides the support for this roll at this angle. Roll 22 is also shown at a like complimentary angle to the floor. Film 12 is in wrapping contact slightly less than the forty-five degrees when film 12 is shown as fed from above roll 10 to roll 14. Where more wrap is desired, the angle may be increased or the direction of flow below on roll 10 may be reversed from clockwise to counterclockwise. After the product 62 has left the forming and welding station and is to be delivered to the cooling roll 60, the positioning of roll 60 immediately below roll 16 or to the left or right is a matter of choice. Whether the product 62 is delivered from roll 60 to an accumulating roll 70 or to a work table is also a matter of choice. A build-up of air-cushioning material on a roll 70 is contemplated to be only a few wraps as the apparatus is contemplated to be started and stopped in accordance with "on demand" requirement.

EMBODIMENT OF FIG. 3

Figure 3:
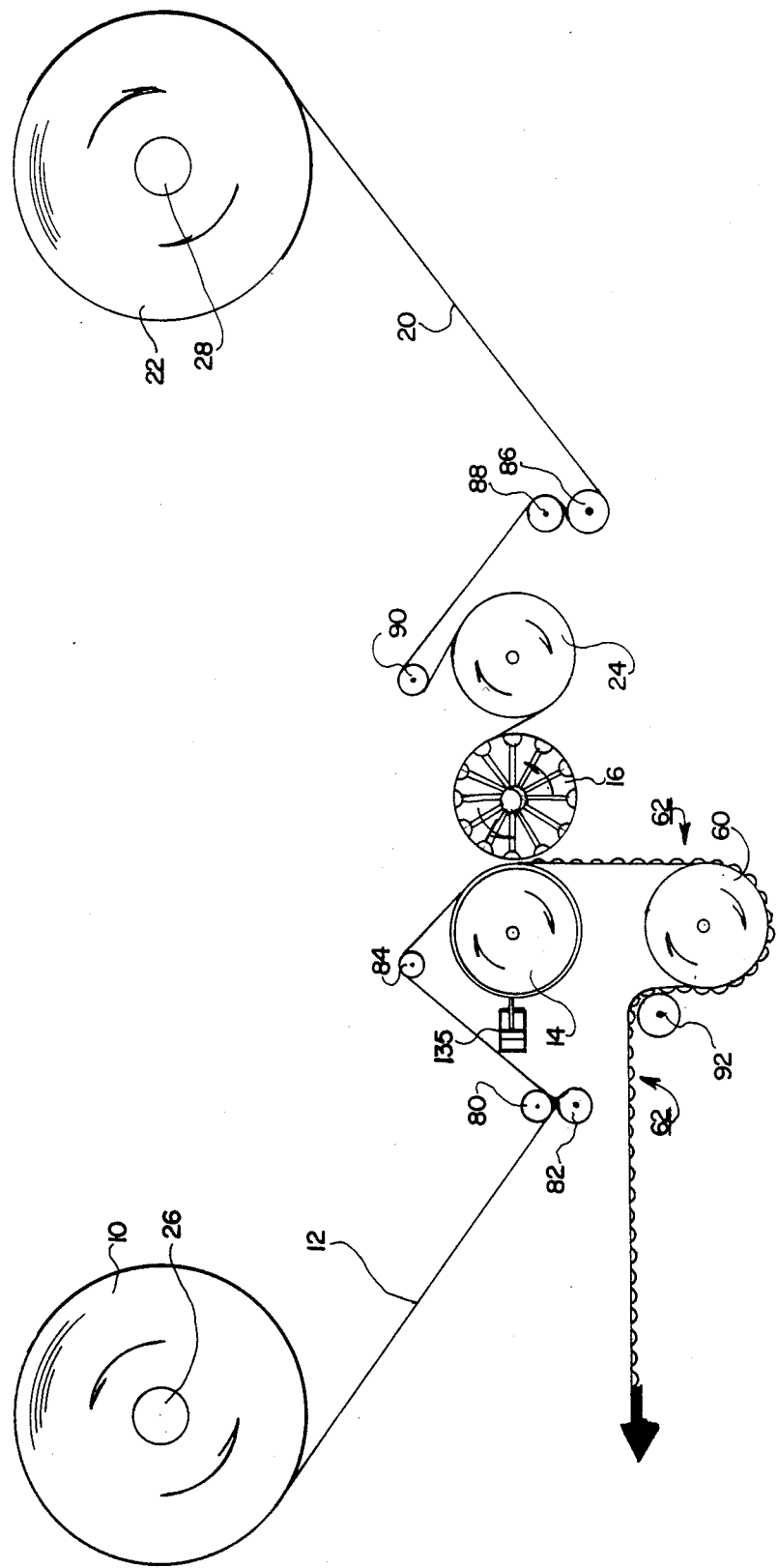
FIG. 3 represents a side view partly in section and very diagrammatic, this apparatus similar to the apparatus of FIG. 1 but with feed roll systems adapted to advance the films at determined speeds to the processing rolls whereat and whereby there is produced the air-cushioning material.

Referring next to FIG. 3, there is depicted air-cushioning forming apparatus very similar to that described above in conjunction with FIG. 1 but with the films 12 and 20 shown as advanced with speed control rolls. In FIG. 1 it is contemplated that the diameter and delivery speed will be controlled by electronic means for both films 12 and 20 as carried by rolls 10 and 22. In the embodiment of FIG. 3, film feed and speed control are provided by opposed nip rolls which are powered at a given selected speed and are disposed to feed the film webs to the welding and forming rolls. Opposed nip rolls are easily controlled as to speed and do not require sensing and computing capability.

In FIG. 3, film 12 is shown carried on roll 10 with the delivery rotation counterclockwise as indicated by the arrows. Although shaft 26 is identified, the film delivery is regulated by nip rolls 80 and 82. These rolls are small in diameter and are powered and speed-controlled by means not shown but conventional. From these nip rolls, the film 12 is carried to an idler roller 84 which is positioned to insure a determined arc of contact and also duration of contact with the resiliently-covered roll 14. This idler roll is positioned so as to move in an arc to increase or decrease the film wrap on roll 14 for optimizing the preheating of film 12 for seal or welding integrity at various line speeds. This wrap and preheat depends on type, thickness and line speed. For example, the surface of the elastomeric covered roll may be less than three hundred degrees F. with non-barrier film and over three hundred degrees F. with barrier-type film. This lidding film material 12 must be heated sufficiently to provide a welding temperature. The pressure roll 14 is movable toward and from forming roll 16 by pneumatic means 85 depicted as a small rectangle. This control or means is conventional with adjusting means for establishing and maintaining the pressure for welding. This pressure depends on the width, thickness and type of film or films.

The other film 20 is also a thermoplastic, flexible material that is adapted for forming into pockets. From roll 12 carried on shaft 28, film 20 is drawn by nip rolls 86 and 88. It is to be noted that, as deicted in FIG. 3, the roll 22 is rotated clockwise. It is also to be noted that from roll 22, the strip of film 20 is directed to the underside of roll 86, thence in a serpentine manner between and around roll 88 and then to an idler roller 90. The nip rollers 86 and 88 are powered and the rotational speed is regulated carefully to accommodate the desired production speed. The idler roller 90, as is idler 84, is mounted and swung in an arc allowing adjustment to be made to increase or decrease the angle of wrap on heating roller 24. Conventionally, this roll 24 is of heat-conductive metal such as aluminum and, to insure release of the film when heated, is provided with a Teflon (TM DuPont) coating. Teflon is a trade name for tetrafluorethylene which is usually applied as a spray and baked cured at a high temperature. This coating provides anti-adhesion property, but there are now other plastic coatings which may be provided. Longevity, wear properties and heat resistance are considerations. The films used in this air-cushioning product establish the surface coating of the associated rolls since sticking of the films to any roll is not desirable. Coaing of any and all rolls in the apparatus used with the transport and processing of the films is contemplated.

This strip of film is heated by tight contact with the surface of this roll to about two hundred fifty degrees as when a barrier film is utilized, and about thirty or more degrees less when a non-barrier film is employed. Speeds of production, type and thickness of film are a consideration in the heating of the film 20 on this roll. From roll 24 this now heat-softened film is delivered to the forming roll 16, shown in greater detail and described in FIG. 1. The cavity configuration, depth and size are a matter of selection and, for normal bubble cushioning, a now-popular size is about three-eighths of an inch in diameter. This provides ease of handling when the product is rolled and is a popular size for table cutting and use.

The heated film 12 as it is advanced from roll 84 passes between the resilient covering 56 on roll 14 and is pressed to welding condition with the now-formed film strip 20 as it proceeds from the forming roll 16 towards cooling roll 60. The pressure applied at the nip of rolls 14 and 16 is adjusted to suit the films used. The outer-surface interstices provided by the cavity-forming roll 16 provide support for the heated and formed film 20 as it is welded to the lidding film 12. After welding of these two films has been achieved as indicated, the now air-cushioning material is fed to cooling roll 60. Although the now welded air-cushioning dunnage is cooled by the air, the roll 60 provides additional cooling of the air-cushioning strip 62. To increase the wrap of the product around roll 60, there is depicted an idler roller 92 which, like idlers 84 and 90 identified above, may be carried by means so that a swing in an arc may be provided to increase or decrease the wrap on this cooling roll 60. The product is cooled by and at this roll so as to be brought to substantially or below room temperature.

The thermoformed film, which is shaped by vacuum on roll 16 in a wrap of slightly less than one hundred eighty degrees, is released as the weld is achieved. The product is carried to roll 60 and about one-quarter around idler roller 92 and, as indicated by the arrow, proceeds to an accumulating roll 70 as in FIG. 1 or may be used directly by the packers on a packing table and with knife or like cutting means. The apparatus of FIGS. 1, 2 and 3 described above is unique in its simplicity and versatility. The thermoforming may use a barrier or a non-barrier film. The pocket size is easily changed by changing the roll 16. The adjustability of the pressure distance between rolls 14 and 16 insures the desired and required welding pressure. The product has been produced at speeds of about two hundred feet per minute. High-quality products have been produced at about one hundred feet per minute, but normal packing and forming speeds are about fifty feet per minute with normal running conditions since heating, wrapping, film materials and ease of handling are an essential consideration.

The showing of FIG. 2 is typical of both the apparatus of FIG. 1 and FIG. 3. Frame 34 includes both front and rear plates 94 and 95 which are retained in spaced relationship by tie rods or the like not shown. Shaft 96 supported by plates 94 and 95 carries roll 24 in a driven manner and also electrical conductors 98 and 99 which feed electrical energy to heater 42. Shaft 101 is also shown as carried by plate members 94 and 95 and is not only rotated in a precise manner and speed, but is hollow in order to mount therein a non-rotating flow control valve 50 which is adapted to cut off vacuum from the cavities 44 and proceeding through conduits 46. This source of vacuum is depicted as connected by a non-rotating collar connection 102 to a conductor 103 to a source of vacuum usually provided by a vacuum pump and not shown. Roll 14 which has an elastomeric covering 56 is also carried by a rotating shaft 105 and in this shaft there are provided conductors to a source of electrical energy, said conductors identified as 107 and 108 and connected to the heating element identified as 54. FIG. 2 is only a diagrammatic showing since construction details are merely a matter of designer selection.

EMBODIMENT OF FIG. 4

Figure 4:
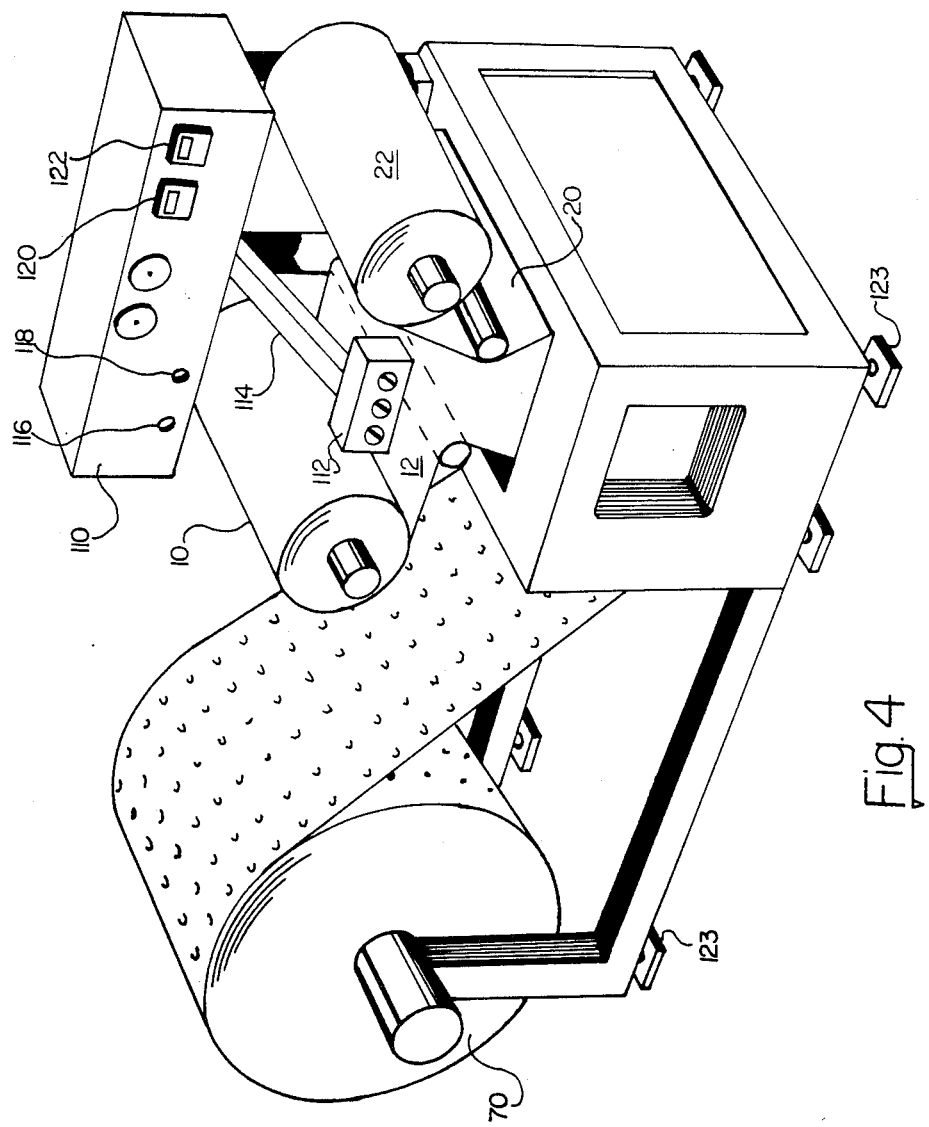
FIG. 4 represents a diagrammatic perspective view of the apparatus and showing particularly the arrangement and controls available to the operator of this apparatus, this view illustrative only of the compact arrangement and with protective means inherent in its construction.

Referring next and finally to FIG. 4, there is depicted a diagrammatic representation of this apparatus to a customer as a potential adjunct to his product and packing line. It is contemplated that with standard size requirements the apparatus will be about four and one-half feet wide and about the same in height. The overall length is about seven feet, but if the air-cushioning material is fed directly to a packing table, which is often the case, the accumulating roll and stand may be eliminated.

An electronic console or control enclosure 110 is carried above rolls 10 and 22 above described. The films 12 and 20 are fed to the forming, welding and other steps in the manufacture above described. A speed and temperature control module 112 carried by a rigid conduit 114 extending to the console 110. Visual displays 116 and 118 provide indicators for stock depletion of rolls 10 and 22. Also carried on the console 110 are temperature meters 120 and 122 indicating the surface temperature for the films fed to rolls 14 and 24. As shown, the apparatus is carried on adjustable pads 123, but this does not preclude other support means such as wheels and shown in FIG. 1.

The apparatus above shown and described contemplates an "on demand" system essentially developed for the supplying of air-cushioning cushioning material for users thereof, particularly in their own plant. The apparatus contemplates a small floor space requirement and a "start" and "stop" of the apparatus presents no problem since heating and cooling are indicated by readout meters. Speed of feeding the films 12 and 20 is electronically controlled and replenishing the roll supply is easily achieved with front-loading capability. The electronically-heated and water-cooled rolls are enclosed within the side-plate portions so as to provide operator protection (see FIG. 4). The heated and cooled rolls as well as the idler rolls may be and preferably are coated with heat-resistant and anti-adhesion material such as Teflon.

There is also contemplated to be provided linear perforation or cross perforation of the product as an optional attachment. Conventionally, web width is twenty-five inches, but this size is not a criterion as apparatus may be provided where larger sizes may be desired. There is also provided indicator means for low web supply. Automatic cutoff at determined travel lengths may be inserted as an option. This apparatus may be run at a speed that is timed to hand- or robot-assembly operation. The bubble size conventionally provided by the cavity roll 16 is with a height of one-eighth, three-sixteenths, one-quarter or one-half inch.

In the above apparatus, the rolls are revolved in both clockwise and counterclockwise directions. In particular, the nip rolls and the welding rolls are rotated so as to be moved into a gripping condition, i.e., toward each other. In the foregoing discussion of the uses of this apparatus, many plastics and mixes including composite structures are mentioned. The above-described apparatus is anticipatd to satisfactorily accommodate all such materials. It is also to be noted that other materials such as foil and the like can be and often are coated with a plastic material by which the strip may be secured to the formed web as a lidding material. This thermoformed film may also be metallized to portray and give a metal appearance or reflection. This forming is to not cause air leakage or destruction of cosmetic appearance. Special welded materials may require a speed-up or a slowing down from conventional speeds, but the versatility of the above-described apparatus anticipates the use of this simple arrangement of components.

As a method, this apparatus with the forming and production of air-cushioning materials for end users' consumption in their own facilities, said material being from two rolls of thermoplastic material such as polyethylene or the like which may be combined with other plastic materials to provide air passage-inhibiting properties, said method providing means for a start and stop of the apparatus for an "on demand" manufacture and supplying of air-cushioning material to said facilities, includes the steps of:

(a) providing a first roll of thin, thermoplastic film having thermoforming properties when heat-softened;

(b) carrying said roll on a supported shaft and as a continuous strip of film and replacing said roll on said shaft when replenishing the film on the first roll is desired or required;

(c) rotating and driving a first heat-conductive roller to and carrying on said roller the strip of first film around which the wrap extent is at least one hundred fifty degrees of arc;

(d) electrically heating said first film on said first heat-conducting roll to a temperature between two hundred and two hundred sixty degrees F. and with a thermostatic control of said first heat-conductive roller whereby and whereon the first film is heat-softened to a thermoforming condition;

(e) rotating a cooled, driven forming roller adjacent to and spacing said forming roller from the first heat-conducting roller so that non-contact is maintained with said first heat-conducting roller and providing between said first roller and said forming roller an S-path of heat-softened first film, said forming roller having its outer peripheral surface formd with a multiplicity of shaped cavities, and providing each cavity at its inner extent a small conductor leading to and terminating at a conductor and further connecting said conductor to source of vacuum;

(f) carrying valve means in association with a conductor to said source of vacuum, and providing with this valve means a mask of a determined extent or sector therewith, and opening of about one-half of the small conductors from the shaped cavities to a source of vacuum so that the heat-softened first film is drawn by vacuum into these shaped cavities forming shaped cell forms, this forming roller cooling the now-formed first film while rotatably and tightly carrying this first film by vacuum on said driven forming roller;

(g) providing a second roll of thin, thermoplastic film as a lidding cover for the air-cushioning material;

(h) driving a thermoconductive pressure roller and heating said roller to a selected temperature by electrical energy and providing on this roll a resilient, thermoconductive cover or outer layer on said pressure roller, said cover having sufficient resiliency and thermal conductivity so that with a wrap of less than ninety degrees of arc, said second lidding film is heated to a welding condition, and with the second film in a wrap condition on said pressure roller said heat is sufficient that the peripheral temperature of the roller brings the second film to a temperature of at least two hundred seventy degrees F. and while the first thermoformed and heated film is brought in way of this second heated, lidding film, pressing these films together into a welded condition, the cover on this pressure roller sufficiently resilient so that with a minimum of applied pressure the second heated film is pressed to and into the first thermoformed film so that at the peripheral interstices between shaped cavities and at the outer surface of the forming roller the welding is achieved, the peripheral speed of the driven pressure roller and the forming roller substantially in coincidence, the welding of the two plies of film material providing in the thermoformed air-cushioning material a multiplicity of air-encased cells;

(i) thermostatically controlling the electrical heating of said driven thermoconductive pressure roll to maintain the temperature in said lidding material provided by this second film where and when the wrap of film is on said roll;

(j) cooling a chill roll and positioning said roll so as to receive the welded strip of material and engaging said welded air-cushioning strip on the outer surface of said material, this cooling sufficient to bring the welded air-cushioning material to a temperature that is at or near room temperature, and (k) carrying said cooled air-cushioning material to accumulation means such as a storage roll or a packing table.

Diagramatically indicated in FIG. 3 for use in the apparatus and/or method is a pneumatic cylinder 125 or the like to move the pressure roll toward the forming roll. The forming roll is conventionally rotatably supported by and in bearing means so that the hollow shaft is fixed in relation to the frame. As the films as to composition and thickness are variable, the pressure roll is controlled in its back-and-forth movement. Also, the heating is usually by a resistance element as it is one of the less-expensive ways to thermostatically control the desired temperature. Alternate heating means such as radiation energy may be made practical so the claims and drawings are merely illustrative of electrical heating. The cooling of the thermoforming roll is by means such as air or water or both. The cooling is controlled as to its capability and degree since the speed and type of film establishes the cooling required. The stripping of the air-cushioned product after welding is usually easily achieved since the air-cell cavities in the forming roller are usually of a tapered configuration, lending the formed cells themselves to easy removal. If the removal of the welded air-cushioning material from the forming roller is difficult, air may be used in conjunction with the small conductors and the arcuate valve means. A blast of air may also be used to assist in removal.

It is to be noted that the several rolls used in this apparatus are contemplated to be coated with an anti-adhesion material so that the film, whether heated or unheated, does not stick to the roll surfaces. This treatment is usually a baked-on tetrafluorethylene (Teflon TM DuPont) or similar material which surface treatment is also of a high-heat resistance, well above the temperatures of the heated films used in the process described above.

Terms such as "left," "right," "up," "down," "bottom, "top," "front," "back," "in," "out," "clockwise," "counterclockwise" and the like are applicable to the embodiments shown and described in conjunction with the drawings. These terms are merely for the purposes of description and do not necessarily apply to the position in which the "on demand" apparatus and method for producing air-cushioning product may be constructed or used.

While particular embodiments of the arrangement of the apparatus have been shown and described, it is to be understood that the invention is not limited thereto, and protection is sought to the broadest extent the prior art allows.

What is claimed is:

1. Apparatus for producing air-cushioning material for end users' consumption in their own facility, said material being from two rolls of thermoplastic material such as polyethylene which may be combined with other plastic materials to provide air passage-inhibiting properties, this apparatus having control means for a start and stop of the apparatus by the operator and without alteration of the produced product by said starting and stopping of the apparatus so as to provide an "on demand" manufacture and supplying of air-cushioning material to said facility, said apparatus including:

(a) a first roll of thin, thermoplastic film having thermoforming properties when heat-softened;

(b) means for carrying said roll on a supported shaft and as a continuous strip of film and means for replacing said roll on said shaft when replenishing of the first roll is desired or required;

(c) a rotatable and driven first heat-conductive roller to and toward which the strip of first film is carried and around which the wrap extent is at least one hundred fifty degrees of arc;

(d) means for electrically heating said first film on said first heat-conducting roll to a temperature between two hundred and two hundred sixty degrees F. and with a thermostatic control of said first heat-conductive roller whereby and whereon the first film is heat-softened to a thermoforming condition;

(e) a temperature-controlled (cooled) driven rotatable roller providing cooling of heat-softened film, said roller adjacent to and spaced from the first heat-conducting roller, but in non-contact with said first heat-conducting roller and between said first roller and said forming roller providing an S-path of heat-softened first film, said forming roller having its outer peripheral surface formed with a multiplicity of shaped cavities, with each cavity having at its inner extent a small conductor leading to and terminating with a conductor which is connected to a source of vacuum;

(f) valve means in association with said conductor of said vacuum, this valve means providing a mask of a determined extent or sector to about one-half of the small conductors from the shaped cavities to said source of vacuum, the remaining shaped cavities open to air, said heat-softened first film wrapped against and on this forming roller so that said heat-softened first film when coming in contiguous contact with those cavities connected to said source of vacuum is drawn by vacuum into these shaped cavities forming shaped cell forms, this forming roller cools the now-formed first film to about 120° F. while rotatably and tightly carrying this first film by vacuum on said driven forming roller;

(g) a second roll of thin, thermoplastic film providing a lidding cover for the air-cushioning material;

(h) a driven thermoconductive pressure roller adapted to be heated to a selected temperature by electrical energy, this roll having a resilient, thermoconductive cover or outer layer on said pressure roller, this cover providing sufficient resiliency and thermal conductivity so that with a wrap of less than ninety degrees of arc, said second lidding film is heated to a welding condition, with the second film in a wrap condition on said pressure roller and with the peripheral temperature of the roller sufficient to bring the second film to a temperature of at least two hundred seventy degrees F. and while the first thermoformed and heated film is brought in way of this second heated, lidding film, these films are pressed together and into a welded condition, the cover on this pressure roller sufficiently resilient so that with a minimum of applied pressure the second heated film engages the first thermoformed film at the peripheral interstices between shaped cavities and at the outer surface of the forming roller, the peripheral speed of the driven pressure roller and the forming roller substantially in coincidence, the weld of the two plies of film material providing in the thermoformed air-cushioning material a multiplicity of air-encased cells, said pressure roll movable toward and away from the forming roll and with the pressure adjustably applied by means such as pneumatic and, once established, maintained to provide a substantially constant pressure commensurate with the type and thicknesses of the films being welded;

(i) means for electrically heating said driven thermoconductive pressure roller to a temperature by which the second film is heated and brought to a welding condition when wrapped on said roll, this temperature of the roll and the lidding film being established and maintained by thermostatic control;

(j) means for cooling a chill roll and disposing said chill roll so as to receive the welded air-cushioning strip product and engage said strip on the outer or lidding film surface and arranging the wrap of said welded air-cushioning product around and in contact with a substantial arcuate surface of said cooling chill roll so that said product is cooled to a temperature that is at or near room temperature, and (k) means for carrying said air-cushioning strip product to an accumulation means such as a roll or packing table.

2. Apparatus for producing air-cushioning materials, as in claim 1, in which the first and second film strips are drawn from their supply-roll condition to associated heated rolls, each of said strips by a pair of opposed nip rolls, at least one of said rolls which is driven to provide an adjustable speed with an associated control means so that film strips are drawn from a supply condition and delivered to the heated rolls at the selected speed.

3. Apparatus for producing air-cushioning materials, as in claim 2, in which between the pair of nip rolls and the associated heated roll there is inteposed an idler roll which is carried by adjustable means so as to be swung in a radial arc around the axis of the associated heated roll.

4. Apparatus for producing air-cushioning materials, as in claim 1, in which the electrical heating of the first heated roll is by a resistance element or elements carried within the shaft on which the roll is carried.

5. Apparatus for producing air-cushioning materials, as in claim 4, in which the electrical heating of the second heated roll is by a resistance element or elements carried within the shaft on which the second roll is carried.

6. Apparatus for producing air-cushioning materials, as in claim 1, in which the air-cushioning product, after forming, welding and cooling, is carried to and accumulated on a removable roll support shaft means and there is provided means to rotate said roll to achieve a wind-up without excessive tautness of the film product.

7. Apparatus for producing air-cushioning materials, as in claim 1, in which the first and second film strips are from composite thermoplastic materials and, when heated, are disposed to be welded to each other.

8. Apparatus for producing air-cushioning materials, as in claim 1, in which there is provided an idler roll disposed to accept and carry the product subsequent to the chill roll and before disposal on the accumulation roll or packing table.

9. Apparatus for producing air-cushioning materials, as in claim 1, in which the valve means is non-rotating as is formed with an arcuate surface to provide vacuum communication of about one-half of the small conductors when brought in way of said arcuate valve means.

10. Apparatus for producing air-cushioning materials, as in claim 9, in which there is also provided cooling means to the forming roll.

11. Apparatus for producing air-cushioning materials, as in claim 1, in which the first heated roller, the forming roller and the chill roller are each of metal and are coated with a release material adapted to present an anti-adhesion capability to the several rollers.

12. Apparatus for producing air-cushioning materials, as in claim 12, in which the anti-adhesion material is tetrafluorethylene or a similar substance.

13. A method for producing air-cushioning material for end users' consumption in their own facilities, said material being from two rolls of thermoplastic material such as polyethylene or the like which may be combined with other plastic materials to provide air passage-inhibiting properties, said method providing means for a start and stop of the apparatus by the operator and without alteration of the produced product by said starting and stopping of the apparatus for an "on demand" manufacture and supplying of air-cushioning material to said facility, said method including the steps of:

(a) providing a first roll of thin, thermoplastic film having thermoforming properties when heat-softened;

(b) carrying said roll on a supported shaft and as a continuous strip of film and replacing said roll on said shaft when replenishing the film on the first roll is desired or required;

(c) rotating and driving a first heat-conductive roller to and carrying on said roller the strip of first film around which the wrap extent is at least one hundred fify degrees of arc;

(d) electrically heating said first film on said first heat-conducting roll to a temperature between two hundred and two hundred sixty degrees F. and with a thermostatic control of said first heat-conductive roller whereby and whereon the first film is heat-softened to a thermoforming condition;

(e) rotating a cooled, driven forming roller adjacent to and spacing said forming roller from the first heat-conducting roller so that non-contact is maintained with said first heat-conducting roller and providing between said first roller and said forming roller an S-path of heat-softened first film, said forming roller having its outer peripheral surface with a controlled temperature and formed with a multiplicity of shaped cavities, and providing each cavity at its inner extent a small conductor leading to a conductor connected to a source of vacuum;

(f) carrying valve means in association with a conductor to said source of vacuum, and providing with this valve means a mask, of a determined extent or sector therewith, and opening of about one-half of the small conductors from the shaped cavities to a source of vacuum so that the heat-softened first film when coming in contiguous contact with those cavities connected to said source of vacuum is drawn by vacuum into these shaped cavities forming shaped cell forms, this forming roller cooling the now-formed first film while rotatably and tightly carrying this first film by vacuum on said driven forming roller;

(g) providing a second roll of thin, thermoplastic film as a lidding cover for the air-cushioning material;

(h) driving a thermoconductive pressure roller and heating said roller to a selected temperature by electrical energy and providing on this roll a resilient, thermoconductive cover or outer layer on said pressure roller, said cover having sufficient resiliency and thermal conductivity so that with a wrap of less than ninety degrees of arc, said second lidding film is heated to a welding condition, and with the second film in a wrap condition on said pressure roller, said heat is sufficient that the peripheral temperature of the roller brings the second film to a temperature of at least two hundred seventy degrees F. and while the first thermoformed and heated film is brought in way of this second heated, lidding film, pressing these films together into a welded condition, the cover on this pressure roller sufficiently resilient so that with a minimum of applied pressure the second heated film is pressed to and into the first thermoformed film so that at the peripheral interstices between shaped cavities and at the outer surface of the forming roller the welding is achieved, the peripheral speed of the driven pressure roller and the forming roller substantially in coincidence, the welding of the two plies of film material providing in the thermoformed air-cushioning material a multiplicity of air-encased cells, and moving the pressure roll toward and away from the forming roll and adjustably applying such pressure and maintaining said pressure to accommodate the type and thickness of the films being welded;

(i) thermostatically controlling the electrical heating of said drive thermoconductive pressure roll to maintain the temperature in said lidding material provided by this second film where and when the wrap of film is on said roll;

(j) cooling a chill roll and positioning said roll so as to receive the welded strip of material and engaging said welded air-cushioning strip on the outer surface of said material, this cooling sufficient to bring the welded air-cushioning material to a temperature that is at or near room temperature, and (k) carrying said cooled air-cushioning material to accumulation means such as a storage roll or a packing table.

14. A method for producing air-cushioning materials, as in claim 13, which includes the further step of drawing the first and second film strips from their storage-roll condition by associated nip rolls and driving at least one of said nip rolls at a selected speed to provide the desired speed of fed film to a heated roll.

15. A method for producing air-cushioning materials, as in claim 14, which further includes the step of interposing between the pair of nip rolls and associated heated roll an idler roll and providing an adjusting means by which the idler roll is carried and swung in a radial arc around the axis of the associated heated roll.

16. A method for producing air-cushioning materials, as in claim 15, which includes the further step of providing an idler roll subsequent to the chill roll, this idler roll disposed so as to carry the now-cooled product to a disposal means.

17. A method for producing air-cushioning materials, as in claim 13, which includes the further step of providing means for winding the product on a removable storage roll which is rotated to achieve a wind-up storage without excessive tautness of the air-cushioning film product.

18. A method for producing air-cushioning materials, as in claim 13, which includes the further step of applying an anti-adhesion coating of tetrafluoroethylene and the like to all rolls which transport and/or heat the first and second films and the product.

* * * * *